May 11, 1954
L. R. PETERS
2,678,187
VALVE ASSEMBLY
Filed June 30, 1949
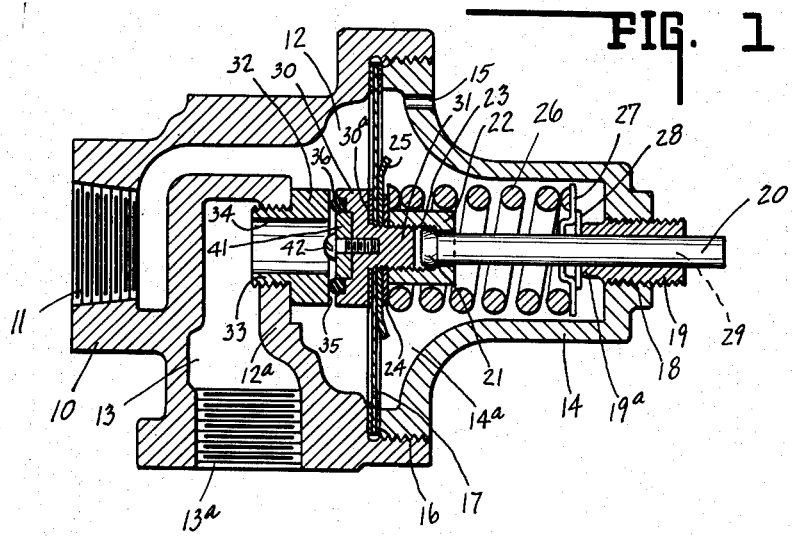
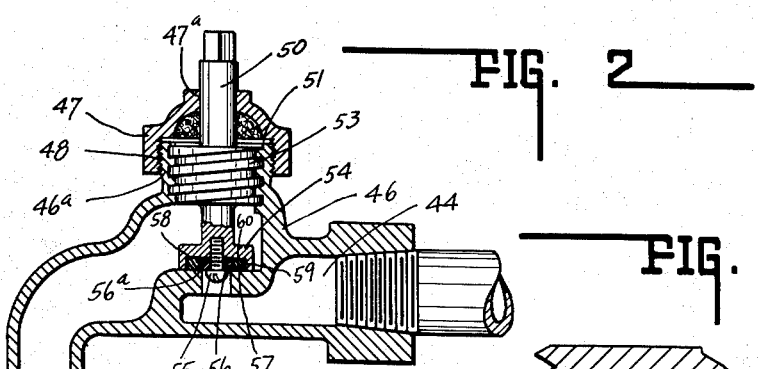
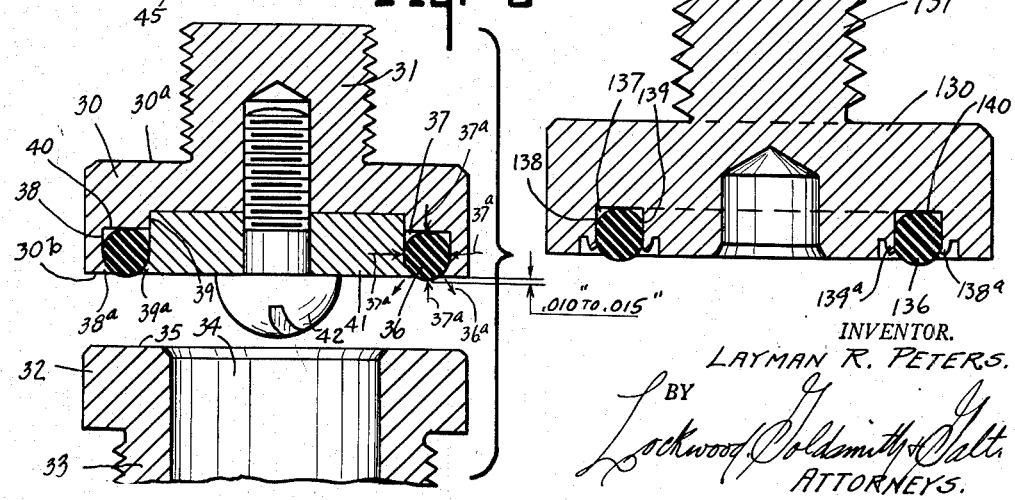
INVENTOR.
LAYMAN R. PETERS.
BY
Lockwood Goldsmith & Galt
ATTORNEYS.

Patented May 11, 1954

2,678,187

UNITED STATES PATENT OFFICE 2,678,187

VALVE ASSEMBLY

Layman R. Peters, Peru, Ind.

Application June 30, 1949, Serial No. 102,417

1 Claim. (Cl. 251—357)

This invention relates to a valve assembly having a valve structure, a valve seat having an annular seal face, each radial element which is defined by a straight line and associating therewith an annular sealing member having more than circular line contact with that face when the valve is closed, the seat confronting face of the seating member having a surface arcuate in radial section.

Valves embodying this invention can be used in various installations and two of these, which are subject to extreme conditions of use, are high pressure relief valves for steam lines and hot water faucet lines. In the former it is the high pressure and high temperature that rapidly deteriorates the conventional bibbs so that such pressure relief valves in continued use do not hold to the initial predetermined adjusted pressure.

The conventional faucet has an undesirable characteristic in that the bibb washer deteriorates by reason of temperature and mechanical wear, the latter being aggravated by the use of a ridge seat.

It is well known in the valve art that sealing surfaces will not hold the seal when both in radial section at their confronting faces have substantially matching straight line elements.

The chief object of the present invention in effect is to insure positive seal by means of two confronting annular seating surfaces wherein the radial sections thereof have effective straight line matching elements when sealing, and wherein the sealing element initially is not subject to load sealing pressure and wherein each radial section thereof has an arcuate contour deformable to a straight line element contour when under sealing pressure and in such a manner that the sealing member cannot take a permanent set under repeated use.

The chief feature of the present invention resides in forming a bibb washer of O ring character and in so mounting the ring that it cannot yield in two transverse directions, one of which is perpendicular to the valve sealing faces and the other of which is substantially parallel to the direction of the force of the pressure fluid to be sealed off.

The full nature of the invention will be understood from the accompanying drawings and the following description and claim:

In the drawings:

Fig. 1 is a central cross-sectional view of a conventional relief valve with the invention embodied therein.

Fig. 2 is a vertical cross-sectional view of a faucet with parts shown in elevation and broken away to more clearly show the invention.

Fig. 3 is an enlarged central cross-sectional view of a valve seat, valve member and an O-ring bibb seal.

Fig. 4 is an enlarged central cross-sectional view of a modified form of valve member and its association with the O-ring bibb seal.

In Fig. 1, 10 indicates a relief valve body having a supply opening 11, a pressure chamber 12 and a drain chamber 13 with opening 13a. Beyond drain chamber 13 is a head 14 having chamber 14a, vented as at 15, which head is threaded into body portion 10 as at 16. A diaphragm 17 is trapped between the body portion 10 and the head 14. Said head at its remote end has a threaded aperture 18 and positioned therein is an adjusting nut 19 which is hollow and mounts a stem 20 having a swivel connection 21 with the member 22 internally threaded at 23. This member bears upon a washer 24 which in turn bears upon a rimmed plate 25 that is in contact with the diaphragm 17.

A load spring 26 bears at one end upon washer 24 and is disposed about the member 22 and at its other end bears against the spring retainer 27 having an operative bearing upon washer 28. These two slide upon stem 20 and engage the inner end 19a of the nut 19. A set screw 29 is carried by the head exposed end of adjusting nut 19 and is adapted to lock the nut and stem together in adjusted position thus holding the spring load adjustment.

Disposed within the pressure chamber 12 and bearing at its rear face 30a upon the diaphragm 17 is the valve body portion 30 having a threaded stem portion 31 that extends through the diaphragm and members 24 and 25 and has rigid threaded connection in the threaded portion 23 of member 22.

Disposed within the pressure chamber 12 is the valve seat providing member 32 having the threaded sleeve portion 33 carried by the partition portion 12a of the pressure chamber 12 and herein integral with the body portion 10. This sleeve and valve seat forming member 32—33 has a central bore 34 therethrough. This is the waste outlet to the drain chamber 13. The valve is open when the pressure in chamber 12 exceeds that load imposed upon the diaphragm by the spring 26. When the pressure is relieved and is less effective than the force of the load spring, the valve is closed by the spring. This opening and closing action is repeated as often as required by pressure increase and decrease, respectively.

Reference will now be had to Fig. 3 wherein the seat, valve member and seal is shown enlarged. The valve body portion 30 has a rear face 30ª, a threaded stem portion 31, and a front face 30ᵇ. The threaded sleeve 33 with valve seat 32 has a front face 35 and a central bore 34 therethrough.

The O ring 36 is confined within an annular channel 37 having a straight side wall 38 terminating in an inwardly directed flange 38ª at the mouth. Channel 37 also has a flat rear surface or wall 40. The washer 41 is secured to the stem portion 31 as by the bolt 42. Said washer has a straight side wall 39 terminating in an outwardly directed flange 39ª at the channel mouth.

The width of channel 37 is determined by the diameter of the O ring, both being substantially the same. The depth of said channel is approximately .010 to .015 of an inch less than the diameter of the O ring. Therefore the O ring maintains pressure at all times with said channel at the three quadrant points as shown at 37ª. When the valve is in closed position the metal front face 30ᵇ is in contact with the front face 35 of the valve seat. This limits the compressive force upon the O ring. The O ring accordingly is forced in the direction of the arrows 36ª and said ring tends to fill the channel 37. This diagonal deformation of the O ring prevents the water or steam from passing around the flange 39ª or between the O ring and the back face of the channel.

Upon opening the valve, the O ring immediately springs back to its normal position because of the three point quadrant contact as previously described.

As initially set forth another valve structure that is subject to extreme wear in use and the bibb of which offers considerable objection when used upon hot water lines is the conventional hot water faucet. In Fig. 2 the invention is shown included in such a faucet. The body portion 46 of the faucet has an intake 44 and an outlet 45. The body projection 46ª is threaded at 48 to receive bonnet 47. Trapped by said bonnet is a bonnet washer 51 ad projecting therethrough is the valve stem 50 which also projects through the bonnet at 47ª.

The upper projection 46ª is internally coarse threaded to receive the coarse threaded body portion 53 of the valve stem. The interior end of said stem terminates in a valve member 54. Secured thereto by bolt 55 is the washer 56 having an outwardly directed annular flange 56ª thereon.

O ring 57 is retained in annular channel 58 in member 54. This channel has a straight line side wall 59 and a straight line rear wall or surface 60. The relationship of the O ring and said channel are the same as previously described relative to the valve structure as shown in Fig. 3.

When the valve member is in the closed position there again is metal to metal contact and the pressure seal is provided by O ring distortion.

Reference will now be had to Fig. 4, wherein another form of the invention is illustrated. Herein the valve body member 130 is formed from a solid piece of metal which has a threaded stem 131 thereon. The O ring 136 is confined within an annular channel 137 having parallel straight line side walls 138 and 139 and a flat rear wall or surface 140. At the channel mouth each side wall may terminate in a coincident ridge 138ª and 139ª respectively. A crimping tool is then applied to said body member which turns inward, as shown the said ridges 138ª and 139ª to trap the O ring in the channel.

The relationship of the O ring in and to said channel is the same as previously described.

While the invention has been illustrated and described in great detail in the drawings and foregoing description, the same is to be considered as illustrative and not restrictive in character.

The several modifications described herein as well as others which will readily suggest themselves to persons skilled in this art, all are considered to be within the broad scope of the invention, reference being had to the appended claim.

The invention claimed is:

In a valve structure, a pair of relatively movable members having confronting faces arranged for contact in substantially parallel relationship, one of said members having an annular recess extending inwardly from its said confronting face providing a bottom wall parallel with said face and an outer wall disposed parallel with the axis of movement of said member, a lip extending inwardly from the edge of said wall adjacent its juncture with said face with its outer surface in the same plane with the latter, a washer in said recess resting upon the said bottom wall and having its outer surface in the same plane with said confronting face, said washer provided with a peripheral wall parallel with the said axis of movement and spaced from the outer wall to provide a space between said walls, a lip projecting outwardly from said peripheral wall adjacent its outer face and into said space, the outer surface of said washer lip disposed in the same plane with the outer face of said washer, the distance between the outer edges of said lips being less than the distance between said annular wall and said periphery, an O-ring seated in said space and of a transverse dimension to normally rest upon said bottom wall and in contact with said outer and peripheral walls with a portion thereof projecting through the space between said lips and slightly beyond the plane of the outer face of said member and said washer, and means for holding said washer in said recess.

References Cited in the file of this patent

UNITED STATES PATENTS

| Number | Name | Date |
|---|---|---|
| 449,161 | Lacy | Mar. 31, 1891 |
| 2,136,835 | Begg | Nov. 15, 1938 |
| 2,417,494 | Hoof | Mar. 18, 1947 |
| 2,538,133 | Tratzik | Jan. 15, 1951 |
| 2,556,308 | Weatherhead | June 12, 1951 |

FOREIGN PATENTS

| Number | Country | Date |
|---|---|---|
| 591,843 | Great Britain | 1947 |
| 117,010 | Switzerland | 1935 |